United States Patent [19]

Reininger

[11] Patent Number: 5,525,254
[45] Date of Patent: Jun. 11, 1996

[54] COMPOSITION FOR REMOVAL OF ADHESIVE

[76] Inventor: Steven J. Reininger, 126 Shadywood La., Streamwood, Ill. 60107

[21] Appl. No.: 453,979

[22] Filed: May 30, 1995

[51] Int. Cl.$^6$ .............................. B08B 3/08; B01F 1/00; C09D 9/00
[52] U.S. Cl. ...................... 252/170; 252/162; 252/174.11
[58] Field of Search .................................. 252/162, 170, 252/174.11

[56] References Cited

U.S. PATENT DOCUMENTS

| | | | |
|---|---|---|---|
| 2,478,319 | 8/1949 | Raub et al. | 252/164 |
| 2,552,520 | 5/1951 | Coler | 252/170 |
| 3,920,472 | 11/1975 | Vinson | 134/6 |
| 3,983,047 | 9/1976 | Vinson | 252/119 |
| 3,998,654 | 12/1976 | Falaas et al. | 134/4 |
| 4,106,901 | 8/1978 | Bishop et al. | 8/139 |
| 4,220,549 | 9/1980 | Moore et al. | 134/4 |
| 4,306,989 | 12/1981 | Motsenbocker | 252/162 |
| 4,336,072 | 6/1982 | Moore et al. | 134/4 |
| 4,483,783 | 11/1984 | Albanese | 252/312 |
| 4,775,489 | 10/1988 | Watkins et al. | 252/552 |
| 4,801,397 | 1/1989 | Flanagan et al. | 252/154 |
| 4,986,936 | 1/1991 | Wolbers | 252/170 |
| 5,045,119 | 9/1991 | Dohner | 134/22.11 |
| 5,300,239 | 4/1944 | Ozaki et al. | 252/86 |

*Primary Examiner*—Linda Skaling Therkorn
*Assistant Examiner*—Gregory R. Delcotto
*Attorney, Agent, or Firm*—Charles F. Meroni, Jr.

[57] ABSTRACT

A liquid composition for removing residual adhesives left behind from reflective and non-reflective vinyl graphics, tape, labels, stickers, etc., from a surface very quickly and safely without causing damage to the host surface and further enabling one to determine if all the adhesive has been removed from the host surface.

2 Claims, No Drawings

COMPOSITION FOR REMOVAL OF ADHESIVE

BACKGROUND OF THE INVENTION

1. Field of the Invention

The present invention relates generally to compositions for removal of adhesives from a surface. More particularly it relates to a composition for removing residual adhesives left on a surface from reflective and non-reflective vinyl graphics, tape, labels, stickers, etc. without causing damage to the surface.

2. Description of the Prior Art

Graphic decals are used by businesses to advertise their company name, logo, trademark or the like and are placed on a variety of surfaces and are usually placed onto vehicles and trailers. Graphic decals can be manufactured in any way a business chooses, from reflective or non-reflective material to life-like four color process graphics.

There are several reasons why decals would need to be removed. Vehicles may be transferred from one company to another, there is a change in advertising strategies, corporate re-identification, additions or deletions to an existing company logo, vehicle leases are terminated, etc.

The major problem associated with graphic decal changes is the removal of the decal and the removal of the decal's residual adhesive. Once a decal has been removed it is also further required to remove the adhesive that remains on the surface. Many factors contribute to the difficulty in the removal process such as the age of the material, the condition of the decal, and the type of material used to manufacture the decal.

Many different types of solvents are available for adhesive removal, however they may require long hours of labor for removal or they are so strong that they can damage the surface. Additionally, these solvents can be hazardous to work with. These solvents also do not provide a method to determine if the entire adhesive has been fully removed since the adhesive may blend in with the color of the surface or can be transparent. Furthermore, conventional methods of adhesive removal require a substantial period of time to scrape off and remove the adhesive while possibly further damaging the surface.

These and other types of adhesive removing compositions disclosed in the prior art do not offer the flexibility and inventive features of my adhesive removal composition. As will be described in greater detail hereinafter, the adhesive removal composition of the present invention differs from those previously proposed.

It is an object of the present invention to provide a composition that can act quickly to release adhesives from surfaces It is a further object of the present invention to provide a composition that is safe and does not cause damage to the host surface.

It is further contemplated to provide a composition that will enable one to determine if all the adhesive has been removed from the surface.

SUMMARY OF THE INVENTION

According to my present invention I have provided a chemical composition for removing residual adhesives at various temperatures from a surface very quickly and safely without causing damage to the host surface. I have further provided a composition that will also enable one to determine if all the adhesive has been removed from the host surface.

Other objects, features and advantages of my invention will become more readily apparent upon reference to the following description.

DETAILED DESCRIPTION OF THE PREFERRED EMBODIMENT

The chemical composition of the present invention is used to remove reflective and non-reflective adhesives. These adhesives could include but are not limited to adhesives manufactured by 3M, Avery, Meyercord, and Fasson. These adhesives are typically used to secure pressure sensitive vinyls used in truck and trailer markings, architectural signs, stickers, labels and window graphics.

The adhesive removal composition of the present invention is designed to absorb into the adhesive and disrupt the bond between the adhesive and the host surface. A colored dye, preferably purple or green, is included in the adhesive removal composition to further identify that the adhesive has absorbed the chemical composition and is eventually fully removed.

The adhesive removal composition of the present invention performs its function without affecting the host surface such as painted or unpainted metals, fiberglass, glass, awning material (of a type known as Flex Face), etc. It is contemplated that this chemical composition can be used on adhesives attached to a variety of different surfaces.

A formulation for a preferred adhesive removal composition according to the invention is set forth below. It is to be understood that this is offered by way of illustration only and is not intended in any way to limit the invention.

The adhesive removal composition contains the following active ingredients between the stated ranges on a volume basis:

methyl ethyl ketone: 6–8% xylene: 34–41% toluene: 36–43% mineral spirits: 10–13%.

In actual practice it may be desirable to add the following active ingredients to provide a colored composition and a fragrance to eliminate the pungent aroma:

a colored dye: 0.05–0.06% an oil based fragrance: 6–8%.

An example of the mixture of the active ingredients is set forth in the following Table I on a parts by weight basis.

TABLE I methyl ethyl ketone: 3.75
xylene: 20
toluene: 21
mineral spirits: 6.25
a colored dye: 0.03
an oil based fragrance: 4.0

Table I describes the ingredients that would provide the best results. There can be a variance of plus or minus 5% by weight of any or all of the ingredients, however, the best results are obtained when using the amount of ingredients described in Table I.

This adhesive removal composition is prepared by mixing and blending all the ingredients together. The ingredients have been formulated in such a manner to absorb into the adhesive and to disrupt the bond between the adhesive and the host surface.

Any variance in the amount of toluene used may cause the adhesive to become slimy, gummy, or sticky and will increase the amount of time to remove the adhesive. Any variance in the amount of xylene used may cause the adhesive to become dry, lumpy and very sticky and will increase the amount of time to remove the adhesive.

Any variance in the amount of methyl ethyl ketone used may cause the adhesive to have a slower absorption rate of the adhesive removal composition. Increasing the volume of methyl ethyl ketone more than 10% will retard the absorption of the adhesive removal composition and the adhesive will remove in a spotty manner, this in turn will require the use of larger amounts of chemical composition and increase the time to remove the adhesive.

Any variance in the amount of mineral spirits may cause the chemical composition to have a faster evaporation rate and will not allow the adhesive to properly absorb the chemical composition. The adhesive would then be removed in spots. If the amount of mineral spirits are increased it will retard the absorption of the other active ingredients thereby increasing the time to remove the adhesive from the host surface.

The fact that the adhesive absorbs the chemical composition, a dye is added to the composition to highlight the adhesive to be removed. Too much dye may stain the surface. Any decrease in the amount of dye used may not be enough to highlight the adhesive. Excellent results are obtained when the dye is purple in color.

The addition of an oil based fragrance does not effect the chemical composition's ability to remove adhesive. The chemical composition by nature has a pungent aroma. The fragrance is strictly used to mask the pungent smell. Any minor increase or decrease in the amount of fragrance used will only effect the smell of the chemical composition.

A typical 1 gallon mixture of the chemical composition set forth in Table I will yield the removal of approximately 75 to 100 square feet of adhesive. The adhesive removed will be of a dry rubbery texture with very little or no tack.

The chemical composition can be used under various temperatures ranging between 35 degrees Fahrenheit and 90 degrees Fahrenheit. The ideal temperature range is 65 degrees Fahrenheit to 80 degrees Fahrenheit.

The preferred method of adhesive removal with the chemical composition set forth above is accomplished as follows. The adhesive can be removed by using a hot water pressure machine. First the hand sprayer of the pressure machine is filled with the chemical composition and the pressurized sprayer is set at approximately 35 psi. The sprayer tip is adjusted so that the chemical composition is released at about a 15 degree angle and the rate of flow is adjusted to approximately 100 square feet per gallon (1 gallon to cover 10 feet by 10 feet). The chemical composition is then applied to the adhesive, preferably in a right to left motion starting at the top of the adhesive. Excellent results are obtained when 20 square feet are treated and removed at a time. The sprayer tip should be approximately 10 to 12 inches from adhesive while applying the chemical composition to the adhesive. The chemical composition will then be absorbed by the adhesive. The chemical composition should be applied to the adhesive until fully saturated. When the adhesive has swollen and remains wet it has reached its saturation point. Excessive run-off of the chemical composition from the adhesive means that there may be too much flow of the chemical composition through the pressure sprayer and the tip of the sprayer should be adjusted to reduce the flow and/or increase the pressure in the sprayer. The saturated adhesive will be distinctly visible due to the colored dye in the chemical composition and will also look swollen due to the absorption of the chemical composition. Any excessive chemical composition applied to and around the adhesive will be easily distinguishable between the saturated adhesive and the host surface.

Once the adhesive is fully saturated with the chemical composition then high pressure hot water can then be immediately used to wash the adhesive off of the surface. The hot water pressure machine is then filled with water and is heated to approximately 190 degrees Fahrenheit and the pressure is set at approximately 3,000 psi. The adhesive is then removed by spraying the hot pressurized water at the composition saturated adhesive, preferably using a downward stroke. The adhesive is best removed in 4 to 6 inch strips using a #6 tip having a 15 degree angle on the end of the pressure wand of the hot water pressure machine. The pressure wand is preferably held at a 30 degree angle to the surface and is held approximately 6 to 8 inches from the adhesive.

During the removal process water may inadvertently get on remaining adhesive that has not yet been saturated by the chemical composition. Since the chemical composition is water soluble it is necessary to displace this water or remove it. This can be done by applying a heavy coat of the composition to the wet adhesive. The chemical composition will displace the water and will also be absorbed by the adhesive.

Adhesive can also be removed using other methods, however the method described above provides quick, easy and safe removal of adhesive from surfaces. The adhesive could also be safely removed from the surface by manually applying or spraying the chemical composition to the adhesive and then scraping the adhesive from the surface with a plastic squeegee or a similar device suitable for scraping adhesive off a surface. It may be necessary to dampen a rag with the chemical composition to remove any traces of adhesive which were not removed be the squeegee by rubbing the dampened rag on the traces of adhesive.

As various possible embodiments may be made in the above invention for use for different purposes and as various changes might be made in the embodiments and method above set forth, it is understood that all of the above matters here set are to be interpreted as illustrative and not in a limiting sense.

I claim:

1. A composition consisting of, on a parts by weight basis:

methyl ethyl ketone: 3.75±0.19 xylene: 20±1.0 toluene: 21±1.05 mineral spirits: 6.25±0.32 and optionally, the presence of an additional component selected from the group consisting of a fragrance, a dye and mixtures thereof.

2. A composition for removing adhesive from a surface consisting of, on a volume basis:

methyl ethyl ketone: 6–8% xylene: 34–41% toluene: 36–43% mineral spirits: 10–13% and optionally, the presence of an additional component selected from the group consisting of a fragrance, a dye and mixtures thereof.

* * * * *